3,476,594
APPLYING HEAT-REFLECTING AND ELECTRICALLY CONDUCTIVE COATINGS ON GLASS
Leif Erik Roland Söderberg, Lidingo, Sweden, assignor to Aga Aktiebolag, Lidingo, Sweden, a corporation of Sweden
No Drawing. Filed Apr. 4, 1966, Ser. No. 539,658
Int. Cl. H05k *3/00;* H01b *1/02;* C03c *17/06*
U.S. Cl. 117—211                               3 Claims

ABSTRACT OF THE DISCLOSURE

A heat reflective and electrically conductive coating is applied to glass by sequentially depositing a nickel layer and a gold layer and heating the coated glass at a temperature of from 150 to 200° C. to provide a desired value of surface resistance. By providing a coated glass in this manner, the good heat reflective properties of gold are obtained without suffering the color distortion heretofore associated with gold layers. The heat transmittance and surface resistivity are markedly reduced by the heat treatment with a slight increase in light transmittance.

---

The invention relates to the coating of glass to improve the heat-reflecting properties thereof and also to make it electrically conductive.

It is known to deposit a thin coating of gold on glass to make it reflect heat radiation. Among the metals, gold has a high power of suppressing long-wave radiation but has the disadvantage of emphasizing, within the visible range, the yellow light, so that objects which are illuminated through such a glass have their colors heavily distorted.

It is also known to use a metal of neutral color, such as nickel, whereby substantially only the level of light is lowered without distortion of the color. However, these metals do not have the same heat-protective effect as gold.

It is furthermore known to use a coating on glass which comprises a mixture of gold and nickel. Such a coating however is of a homogeneous nature and will have the same influence on light and heat rays irrespective of the direction from which they come.

An object of the invention is to provide a coating on glass for improving the heat-reflecting properties thereof with as little undesirable side effects on the color transmission or reflection as possible, as will become apparent in more detail from the following.

Another object of the invention is to provide a coating on glass for improving the electrical conductivity thereof.

It has now been found that through the use of a pair of coatings, the first one being nickel and the second one gold, it is possible, first, to combine the advantnages of the two metals without the disadvantages being prominent to the same extent, and, second, to obtain an improvement over glass coated with a mixture of the two metals with regard to the reflection of light without appreciable color distortion. For instance, a window-pane coated in this manner and mounted with the coated surface facing inwardly will appear, when viewed from outside, substantially as a pane coated with only nickel, i.e. without appreciable color distortion. If the percentage (by weight) of gold relative to the total quantity of metal in the coating is between 30 and 80, the glass has good heat-reflecting properties without the gold color being too prominent.

It has also been found that the advantageous properties can be further enhanced by subjecting the coated glass to a heat treatment according to the invention, so that the ratio of transmission for visible light to that for heat radiation is between the values for the coated metals individually. If the glass is now viewed from the coated side in reflected light it appears yellowish in color owing to reflection in the gold layer. If the glass is then heat-treated, preferably at least 150° C., during some time, this yellowness is reduced at the same time as the transmission within the visible range increases and the transmission of heat radiation decreases. The required time for the heat treatment depends on the temperature; a low temperature may be to some extent compensated for by a longer duration. Furthermore, the heat-treatment appreciably lowers the surface resistance of the glass and makes it more suitable for producing heat by supplying current.

The deposition of the nickel and gold layers may be performed by known methods, however, we have found electroless methods to be the most suitable. The preferred methods are those stated in the example below. With regard to the deposition of nickel, it is also possible to use the method described in U.S. Patent 2,702,253.

EXAMPLE

The following solutions may be used:

Catalyst 1

| | | |
|---|---|---|
| $SnF_2$ | g | 2 |
| $H_2O$ | g | 1000 |
| pH | | 2.5 |

Catalyst 2

| | | |
|---|---|---|
| $PdCl_2$ | g | 1 |
| $H_2O$ | g | 3000 | pH between 3.9 and 4.2.

Nickel bath

| | | |
|---|---|---|
| $NiSO_4$ | g | 25 |
| $CH_3COONa$ | g | 25 |
| Sodium hypophosphite | g | 25 |
| Hydrazine sulphate | g | 10 |
| $H_2O$ | g | 1000 |
| pH | | 4.5 |

Temperature between 30 and 40° C.

Gold bath

| | | |
|---|---|---|
| $KAu(CN)_2$ | g | 3 |
| $NH_4Cl$ | g | 50 |
| Hydrazine sulphate | g | 10 |
| Ethylene diamine | g | 10 |
| $H_2O$ | g | 1000 |
| Temperature | ° C. | 60 | pH between 8 and 9.

The glass is treated with these solutions in the above order, each treatment being preceded by rinsing with water. There follows then the Heat Treatment which comprises heating to 180° C. for one hour.

With regard to the catalysts and the baths indicated above, neither the pH nor the temperature values are particularly critical. For the catalysts, a momentary treatment will do; for the nickel and gold baths, the duration of the treatment controls the thickness of the layer of metal deposited. It is difficult to state in terms of thickness how much Ni should be deposited, but it is believed that suitable values for the Ni layer deposited should be from 30 to 100 A. As for the quantity of gold to be deposited, we have found it preferable to make the gold content of the coating be between 30 and 80% by weight.

The heat treatment should preferably be carried out above 150° C., and should be continued as long as an improvement in the desired qualities is obtained. The higher the temperature, the shorter will be the time required, but the temperature cannot ordinarily be raised appreciably above 200° C. owing to oxidation and other reactions.

The following table gives values of light and heat transmittance as well as surface resistance of a glass having initial light and heat transmittance values of 90% after the various stages of the method according to the invention. These are representative values indicative of the quantities of nickel and gold to be deposited. The ranges stated in parentheses are intervals within which the advantages of the method according to the invention are believed to be significant.

|  | Light transmittance, percent | Heat transmittance, percent | Surface resistance, ohms |
|---|---|---|---|
| After Ni bath treatment | 40 (20–60) | 40 (20–60) | 40,000 (10,000–200,000) |
| After Au bath treatment | 40 (20–60) | 35 (20–50) | 1,000 (200–5,000) |
| After heat-treatment | 45 (25–55) | 30 (25–45) | 100 (20–500) |

"Surface resistance," as used in this specification, means the resistance measured between a pair of linear electrodes placed to contact the coated surface along a pair of opposite sides of a square.

What is claimed is:
1. A method of applying a heat-reflecting and electrically conductive coating to glass, comprising the steps of depositing a layer of Ni having a thickness of from 30 to 100 A. on the glass, depositing on said Ni layer a layer of Au having a thickness such that the gold amounts to from 30 to 80% by weight based on the weight of nickel and gold, and subjecting the coated glass to a heat treatment at between 150 and 200° C. and of a duration sufficient to decrease surface resistance and heat transmittance and sufficient to increase the light transmittance of the coated glass.

2. A method according to claim 1, wherein the heat treatment is carried out at a temperature of substantially 180° C.

3. A method according to claim 1, wherein Ni is deposited until the layer of Ni reduces the visible-light transmittance of the glass to between 20 and 60%.

References Cited
UNITED STATES PATENTS

| 1,222,049 | 4/1917 | Tillyer | 117—33.3 X |
| 2,430,581 | 11/1947 | Pessel | 117—217 X |
| 2,724,663 | 11/1955 | Bond | 117—71 |
| 2,757,104 | 7/1956 | Howes | 117—211 X |
| 2,799,600 | 7/1957 | Scott | 117—211 |

OTHER REFERENCES

Fox, L. P.: Gold Plating Semiconductive Silicon Body, RCA TN No. 366, June 1960, pp. 117–71.

Hardy, A. C. et al.: The Principles of Optics, New York, McGraw-Hill, 1932, p. 402.

ALFRED L. LEAVITT, Primary Examiner

J. R. BATTEN, JR., Assistant Examiner

U.S. Cl. X.R.

29—195; 117—35, 54, 71, 124, 217